United States Patent [19]

Gerner

[11] Patent Number: 5,266,838
[45] Date of Patent: Nov. 30, 1993

[54] POWER SUPPLY SYSTEM INCLUDING POWER SHARING CONTROL ARRANGEMENT

[75] Inventor: William Gerner, Oxford, Mass.

[73] Assignee: Thinking Machines Corporation, Cambridge, Mass.

[21] Appl. No.: 802,656

[22] Filed: Dec. 5, 1991

[51] Int. Cl.⁵ .............................................. H02J 1/10
[52] U.S. Cl. ..................................... 307/19; 307/29; 307/82; 307/85; 363/65
[58] Field of Search ....................... 307/19, 29, 38, 82, 307/85; 363/65

[56] References Cited

U.S. PATENT DOCUMENTS

| | | | |
|---|---|---|---|
| 2,611,796 | 9/1952 | Conangla | 171/97 |
| 2,885,569 | 5/1959 | Schuh et al. | 307/87 |
| 3,229,164 | 1/1966 | McCartney et al. | 317/22 |
| 4,062,057 | 12/1977 | Perkins et al. | 307/82 |
| 4,074,182 | 2/1978 | Weischedel | 307/82 |
| 4,205,235 | 5/1980 | Pal et al. | 290/44 |
| 4,257,090 | 3/1981 | Kroger et al. | 363/65 |
| 4,356,402 | 10/1982 | Morimoto et al. | 307/85 |
| 4,628,433 | 12/1986 | Notohamiprodjo | 363/65 |
| 4,651,020 | 3/1987 | Kenny et al. | 307/43 |
| 4,659,942 | 4/1987 | Volp | 307/19 |
| 4,729,086 | 3/1988 | Lethellier | 363/65 |
| 4,749,908 | 6/1988 | Stifter | 315/86 |
| 4,860,188 | 8/1989 | Bailey et al. | 363/65 |
| 5,038,265 | 8/1991 | Paladel | 307/82 |

Primary Examiner—J. L. Sterrett
Attorney, Agent, or Firm—Richard A. Jordan

[57] ABSTRACT

A power supply system for powering a plurality of loads. The system includes a plurality of energizeable power supply circuits each associated with one of the loads for supplying power thereto in response to a power supply circuit control signal. An actuable power sharing arrangement is connected to all of the power supply circuits to facilitate sharing of power among the power supply circuits in response to a power sharing control signal. In addition, a control circuit generates the power supply control signals to individually controlling energization of each of the power supply circuits and the power sharing control signal to maintain the power sharing arrangement in an actuated condition when the power supply circuit control signals are controlling all of the power supply circuits to be energized, and otherwise maintaining the power sharing arrangement in a de-actuated condition. Thus, while the control circuit is generating the power supply control signals to control all of the power supply circuits to be energized the power sharing arrangement is sharing power among the power supply circuits to ensure continuous availability of power to all of the loads in the event one of the power supply circuits should fail. On the other hand, while the control circuit generates the power supply control signal to de-energize one of the power supply circuits, to generate the power sharing control signal so as to de-actuate the power sharing arrangement to disable it from sharing power among the power supply circuits.

9 Claims, 1 Drawing Sheet

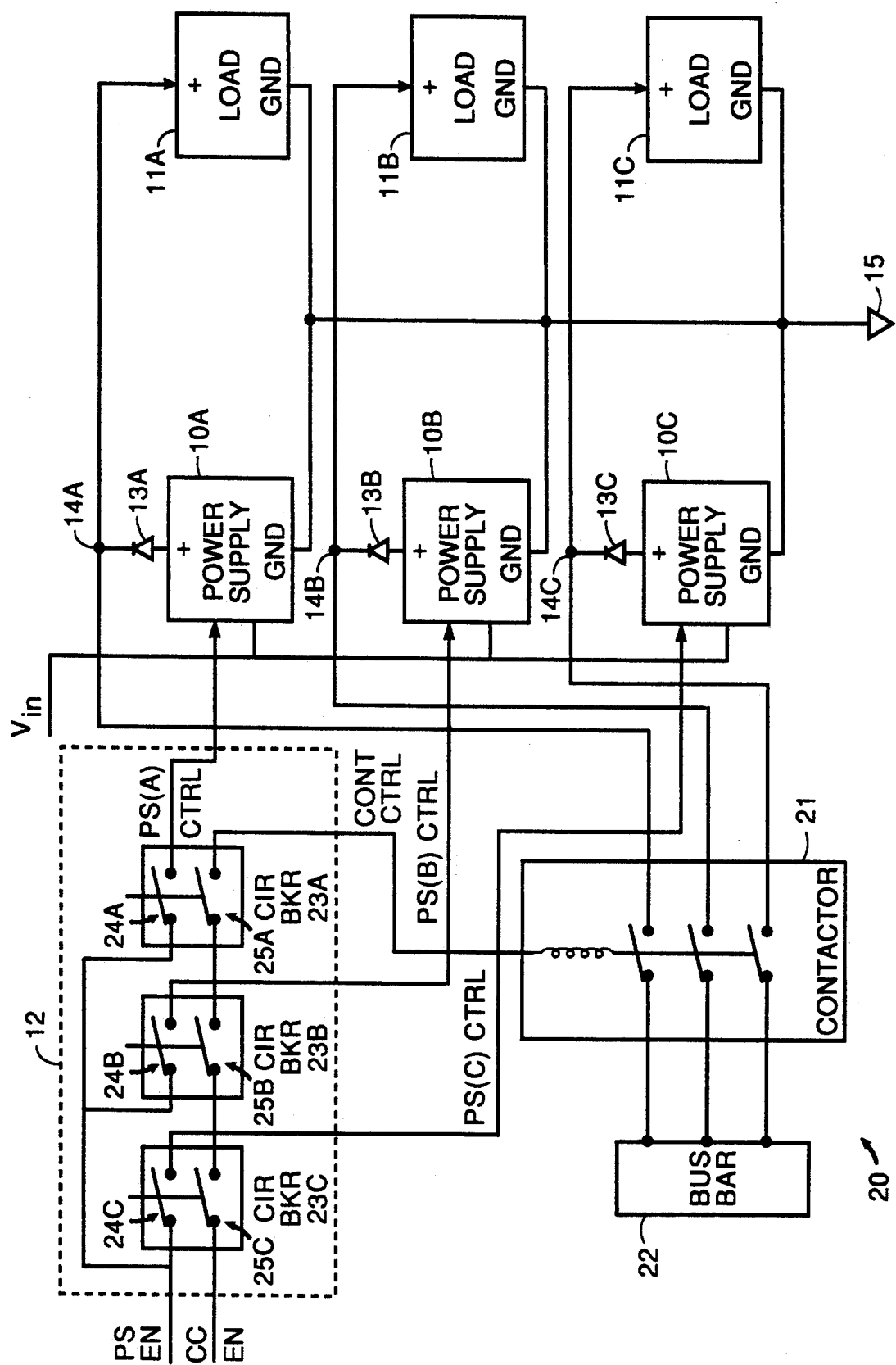

POWER SUPPLY SYSTEM INCLUDING POWER SHARING CONTROL ARRANGEMENT

FIELD OF THE INVENTION

The invention relates generally to the field of systems for providing electrical power to a plurality of loads, and more specifically to systems for facilitating the sharing of power from a plurality of power supply circuits to ensure uninterrupted power to a plurality of loads.

BACKGROUND OF THE INVENTION

Electronic equipment requires a source of electrical power to operate. Typically, electrical power is obtained from AC power lines, and processed through one or more power supply circuits to provide power at the particular voltage levels that the electronic equipment requires. To minimize the likelihood that the equipment will be unavailable due to a failure of a power supply circuit, often a spare power supply circuit is provided which can be switched in to provide power in the event one of the power supply circuits fails. Providing a spare power supply circuit can ensure continuous availability of the electronic equipment, but it can also increase the cost. In addition, before a failed or failing power supply circuit is switched out, sometimes variations in voltage of the power supplied thereby can make operation of the electronic equipment powered thereby unreliable. Further, the operation of switching a failing power supply circuit out and the spare power supply circuit in can cause undesirable voltage transients which can also make operation of the electronic equipment unreliable.

SUMMARY OF THE INVENTION

The invention provides a new and improved power supply system for providing electrical power to a plurality of loads to ensure uninterrupted power to a plurality of loads and which also facilitates the powering-down of one of the loads for maintenance while maintaining power to the other loads.

In brief summary, the invention provides a power supply system for powering a plurality of loads. The system includes a plurality of energizeable power supply circuits each associated with one of the loads for supplying power thereto in response to a power supply circuit control signal. An actuable power sharing arrangememt is connected to all of the power supply circuits to facilitate sharing of power among the power supply circuits in response to a power sharing control signal. In addition, a control circuit generates the power supply control signals to individually controlling energization of each of the power supply circuits and the power sharing control signal to maintain the power sharing arrangement in an actuated condition when the power supply circuit control signals are controlling all of the power supply circuits to be energized, and otherwise maintaining the power sharing arrangement in a de-actuated condition. Thus, while the control circuit is generating the power supply control signals to control all of the power supply circuits to be energized the power sharing arrangement is sharing power among the power supply circuits to ensure continuous availability of power to all of the loads in the event one of the power supply circuits should fail. On the other hand, while the control circuit generates the power supply control signal to de-energize one of the power supply circuits, to generate the power sharing control signal so as to de-actuate the power sharing arrangement to disable it from sharing power among the power supply circuits.

BRIEF DESCRIPTION OF THE DRAWINGS

This invention is pointed out with particularity in the appended claims. The above and further advantages of this invention may be better understood by referring to the following description taken in conjunction with the accompanying drawings, in which the sole FIGURE is a block diagram depicting a power supply system constructed in accordance with the invention.

DETAILED DESCRIPTION OF AN ILLUSTRATIVE EMBODIMENT

With reference to the FIGURE., a power supply system constructed in accordance with the invention includes a plurality of power supply circuits 10A through 10C (generally identified by reference numeral 10($i$)) each having an associated load 11A through 11C (generally identified by reference numeral 11($i$)). Each power supply circuit 10($i$) receives an input voltage $V_{IN}$ from an external power source (not shown). If an associated PS(i) CTRL power supply "i" control signal from a control circuit 12 is at a high asserted voltage level, the power supply circuit 10($i$) is energized to supply power at a positive voltage level at a positive voltage output terminal, indicated by the symbol "+." Preferably, all of the power supplies 10($i$) supply power at their respective output terminals at the same voltage level.

Each power supply circuit's positive voltage output terminal is connected to an anode terminal of an associated diode 13($i$), whose cathode terminal is connected to a node 14($i$). When a power supply circuit 10($i$) is actuated, the diode 13($i$) supplies power to the associated node 14($i$) at a voltage level corresponding to the voltage level provided by the power supply circuit 10($i$), less a small voltage drop as determined by the internal resistance of the diode 13($i$) and the amount of current coupled therethrough from the power supply circuit 10($i$).

Each load 11($i$) also has a positive voltage input terminal, indicated by the symbol "+," which also connects to the respective node 14($i$). Preferably, all of the loads 11($i$) require power at their respective input terminals at the same voltage level. Each load 11($i$) also has a ground voltage terminal, indicated by "GND." The ground terminals of all of the power supply circuits 10($i$) and loads 11($i$) may be connected to a common ground terminal 15.

All of the nodes 14($i$) are also connected to a power sharing arrangement 20, specifically to a contactor 21. Contactor 21 essentially comprises a three-pole, single throw switch, with each node 14($i$) being connected to one pole. The contactor 21 is controlled by a CONT CTRL contactor control signal from the control circuit 12 so that, when the CONT CTRL signal is at a high asserted voltage level, the contactor 21 is actuated to connect all of the nodes 14($i$) to a bus bar 22. Effectively, when the contactor is in the actuated condition, the bus bar 22 connects all of nodes 14($i$) in parallel. It will be appreciated that, with all of nodes 14($i$) connected in parallel, their voltage levels will also be maintained at the same voltage level, even if one or more of the power supply circuits 10($i$) is defective or is otherwise unable to maintain power at that voltage level.

On the other hand, if the control circuit 12 de-actuates the contactor 21, the nodes 14($i$) are disconnected from the bus bar 22. In that condition, the voltage level of each node 14($i$) corresponds to that provided by its associated power supply circuit 10($i$), less the voltage drop provided by the associated diode 13($i$). Thus, if the control circuit de-actuates a particular power supply circuit 10($i$), with the contactor 21 also being de-actuated, the associated load 11($i$) will be unpowered.

The control circuit 12 comprises three circuit breakers 23A through 23C (generally identified by reference numeral 23($i$)) each of which is associated with one of the power supply circuits 10($i$). Each of the circuit breakers 23($i$) may be individually actuated and de-actuated by an operator. When a circuit breaker 23($i$) is actuated, it asserts the PS(i) CTRL power supply "i" control signal to energize the associated power supply circuit 10($i$); otherwise the circuit breaker 23($i$) maintains the PS(i) CTRL signal in a negated condition. The control circuit 12 maintains the CONT CTRL contactor control signal in the asserted condition when all of the circuit breakers 23($i$) are actuated; if any circuit breaker 23($i$) is de-actuated, the control circuit maintains the CONT CTRL signal in the negated condition.

Within the control circuit 12, each circuit breaker 23($i$) includes a double-pole/single-throw switch, with one pole 24($i$) controlling the condition of the PS(i) CTRL power supply "i" control signal. Each pole 24($i$) is connected to receive a PS EN power supply enabling signal so that, when the circuit breaker 23($i$) is actuated, the pole 24($i$) couples the PS EN power supply enabling signal as the PS(i) CTRL signal.

The second poles 25($i$) of all of the circuit breakers 23($i$) jointly control the condition of the CONT CTRL contactor control signal. The second poles 25C, 25B and 25A are connected in series, with pole 25C receiving an asserted CC EN contactor control enabling signal. If circuit breaker 23C is actuated, the pole 25C couples the asserted signal to pole 25B of circuit breaker 23B, and if circuit breaker 23B is also actuated, pole 25B couples it to pole 25A of circuit breaker 23A. Finally, if circuit breaker 23A is also actuated, pole 25A couples the asserted signal, which it receives from pole 25B, as the asserted CONT CTRL contactor control signal. It will be appreciated that if any of the poles 25($i$) is open the asserted CC EN contactor control enabling signal will be blocked, in which case the CONT CTRL signal will be negated to de-actuate the contactor 21.

In operation, if all of the circuit breakers 23($i$) are actuated, the respective poles 24($i$) couple asserted PS(i) CTRL power supply "i" control signals to respective power supply circuits 10($i$), and poles 25($i$) jointly couple the asserted CONT CTRL contactor control signal to contactor 21. In that case, the power supply circuits 10($i$) are all energized to supply power, through their respective diodes 13($i$), to nodes 14($i$) to power the loads 11($i$). Since the contactor 21 is actuated, bus bar 22 connects the nodes 14($i$) in parallel so that if a power supply, such as power supply circuit 10($i_d$) becomes defective (the "d" subscript indicating the index "i" of the particular power supply circuit 10($i$) which is defective, the others can provide the necessary power for its associated load 11($i_d$).

On the other hand, if a circuit breaker 23($i_m$) is de-actuated, which may occur if it is necessary to de-energize load 11($i_m$) to provide maintenance of the like (index $i_m$ identifying the index of a load requiring maintenance), pole 24($i_m$) causes the PS($i_m$) CTRL power supply "j" control signal to be negated, which, in turn, de-energizes power supply circuit 10($i_m$). In addition, the pole 25($i_m$) blocks the asserted CC EN contactor control enabling signal, to thereby negate the CONT CTRL contactor control signal. When that occurs, the contactor 21 is de-actuated, severing the connections between the nodes 14($i$) and the bus bar 22. The power supply circuits 10($i$) which are not defective remain energized so as to maintain their loads 11($i$) in an energized condition. However, since power supply circuit 10($i_m$) is de-energized, and since node 14($i_m$) does not receive power from the bus bar 22, the load 11($i_m$) is in a de-energized condition. This permits the load 11($i_m$) to be provided with maintenance, while the remaining loads 11($i$) ("i" not equal to "$i_m$") may continue operating.

Thereafter, the load 11($i_m$) may be returned to an energized condition by reactivating the circuit breaker 23($i_m$) in control circuit 12. When that occurs, the pole 24($i_m$) again couples that asserted PS EN power supply enabling signal as the asserted PS($i_m$) CTRL power supply "$i_m$" control signal to energize the power supply circuit 10($i_m$). In addition, if the other circuit breakers 23($i$) ("i" not equal to "$i_m$") are also actuated, the actuation of the circuit breaker 23($i_m$) enables pole 25($i_m$) to stop blocking the asserted CC EN contactor control enabling signal, which in turn enables the CONT CTRL contactor control signal to be asserted. The assertion of the CONT CTRL signal enables the contactor 21 to be actuated, which couples all of the nodes 14($i$), including node 14($i_m$) to be connected to bus bar 22. In that condition, if any of the power supply circuits 10($i$), such as a circuit 10($i_d$) as referenced above, were to thereafter fail, power would be supplied to the associated node 14($i_d$) and load 11($i_d$) from the other power supply circuits 10($i$) ("i" not equal to "$i_d$") through the bus bar 22.

It will be appreciated that the power supplies are preferably selected so that each can maintain its output voltage at the energized level even when at least one of them is defective and no longer supplying power, or is supplying power at a reduced level. If all of the power supplies are properly supplying power, each will be supplying current at a particular level. However, if one of the power supply circuits 10($i_d$) is defective, the other power supply circuits 10($i$) ("i" not equal to "$i_d$") will be required to supply power at an increased current level. Accordingly, the power supplies should be able to provide current, at a constant voltage level, over at least that current range.

It will also be appreciated that the diodes 13($i$) are provided to to ensure that current does not flow from a node 14($i$) back into a power supply circuit 10($i$), which may occur if the power supply circuit 10($i$) is defective and unable to maintain its voltage output terminal at the energized voltage level. Otherwise, current may be directed to the defective power supply circuit 10($i$), which may otherwise increase the amount of current required to be provided by the other power supplies. If a particular power supply circuit includes such a diode in its internal circuitry, the diode 13($i$) may be omitted.

It will also be appreciated that the system depicted in FIG. 1 may be suitably adapted to provide power at negative voltage levels to respective loads. In such a system, the power supply circuits 10($i$) would provide power at negative voltage levels at their respective voltage output terminals and the diodes 13($i$) would be connected in the opposite directions, that is, the cathodes would be connected to the voltage output terminals and the anodes connected to the nodes 14(i). With the diodes 13(i) so connected, the power supply circuits 10(i) would be able to provide power at negative voltage levels to nodes 14(i).

Further, it will be appreciated that a power supply system within the scope of the invention may have different numbers of power supply circuits 10(i) and loads 11(i) than shown in the FIGURE. In such a system, there would be provided a pole of contractor 21 and a circuit breaker associated with each power supply circuit and load.

In addition, if the loads 11(i) require power at a plurality of voltage levels, the power may be supplied by a like plurality of power supply systems, including a contactor 21, bus bar 22 and a set of power supply circuits 10(i), each power supply circuit being associated with one load, all for providing power at one voltage level and all controlled by a common control circuit 12. In the common control circuit 12, a circuit breaker 23(i) will provide a PS(i) CTRL power supply "i" control signal for controlling all of the power supply circuits 10(i) which provide power at the various voltage levels to a particular load 11(i), and the CONT CTRL contactor control signal will control all of the contactors in unison.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A power supply system for powering a plurality of loads comprising:
   A. a plurality of energizeable power supply circuits each connected to one of the loads for supplying power thereto in response to a power supply control signal;
   B. an actuable power sharing arrangement connected to all of the power supply circuits for sharing power among the power supply circuits in response to a power sharing control signal, said power sharing arrangement being (i) actuated to share power among the power supply circuits in response to the power sharing control signal being asserted, and (ii) deactuated so as not to share power among said power supply circuits in response to the power sharing control signal being negated; and
   C. a control circuit for generating the power supply control signals to individually control energization of each of the power supply circuits, the control circuit further asserting the power sharing control signal to maintain the power sharing arrangement in an actuated condition when the power supply circuit control signals are controlling all of the power supply circuits to be energized, and otherwise negating the power sharing control signals to maintain the power sharing arrangement in a deactuated condition;

whereby:
   (i) while the control circuit controls the power supply control signals to control all of the power supply circuits to be energized, it contemporaneously asserts the power sharing control signal to actuate the power sharing arrangement to share power among the power supply circuits to ensure continuous availability of power to all of the loads in the event of failure of one of the power supply circuits, and
   (ii) while the control circuit controls the power supply control signal to de-energize one of the power supply circuits, it contemporaneously negates the power sharing control signal so as to de-actuate the power sharing arrangement to disable it from sharing power among the power supply circuits.

2. A power supply system as defined in claim 1 in which said control circuit includes a plurality of power supply control devices each controlling the power supply control signal for one of said power supply circuits, the power supply control devices being further connected in series to jointly control the power sharing control signal.

3. A power supply system as defined in claim 2 in which each power supply control device comprises a double-pole single-throw circuit breaker in which a first pole controls the power supply control signal of one of said power supply circuits, and second poles of all of said circuit breakers being connected in series to control the power sharing control signal.

4. A power supply system as defined in claim 1 in which each power supply circuit includes a power supply terminal for supplying power to one of said power sharing arrangement including a multi-pole contactor including a plurality of poles each connected to a power supply terminal, said contactor when actuated in response to said power supply control signal connecting said power supply terminals to a common node to effectively share power from said power supply circuits among all of said loads, and said contactor when de-actuated disconnecting said power supply terminals from said common node so that each power supply terminal is only connected to one of said loads.

5. A power supply system as defined in claim 1 in which said each power supply circuit includes:
   A. a power supply terminal connected to a load;
   B. an energizeable power supply for generating power in response to one of said power supply control signals; and
   C. a diode for coupling power from said power supply to said power supply terminal, said diode being connected so as to resist transfer of power from said power supply terminal toward said power supply in the event of failure of the power supply.

6. A power supply system for powering a plurality of loads comprising:
   A. a plurality of energizeable power supply circuits each including a power supply terminal for supplying power to one of said loads in response to a power supply control signal;
   B. a actuable power sharing arrangement connected to all of the power supply circuits for sharing power among the power supply circuits in response to a power sharing control signal, said power sharing arrangement including a multi-pole contactor including a plurality of poles each connected to a power supply terminal, said contactor when actuated in response to said power supply control signal connecting said power supply terminals to a common node to effectively share power from said power supply circuits among all of said loads, and said contactor when de-actuated disconnecting said power supply terminals from said common node so that each power supply terminal is only connected to one of said loads; and C. a control circuit for generating the power supply control signals to individually control energization of each of the power supply circuits, the control circuit further generating the power sharing control signal to maintain the power sharing arrangement in an actuated condition when the power supply circuit control signals are controlling all of the power supply circuits to be energized, and otherwise maintaining the power sharing arrangement in a de-actuated condition;

whereby:
(i) while the control circuit controls the power supply control signals to control all of the power supply circuits to be energized, it contemporaneously controls the power sharing arrangement to share power among the power supply circuits to ensure continuous availability of power to all of the loads in the event of failure of one of the power supply circuits, and
(ii) while the control circuit controls the power supply control signal to de-energize one of the power supply circuits, it contemporaneously controls the power sharing control signal so as to de-actuate the power sharing arrangement to disable it from sharing power among the power supply circuits.

7. A power supply system as defined in claim 6 in which said control circuit includes a plurality of power supply control devices each controlling the power supply control signal for one of said power supply circuits, the power supply control devices being further connected in series to jointly control the power sharing control signal.

8. A power supply system as defined in claim 7 in which each power supply control device comprises a double-pole single-throw circuit breaker in which a first pole controls the power supply control signal of one of said power supply circuits, and second poles of all of said circuit breakers being connected in series to control the power sharing control signal.

9. A power supply system as defined in claim 6 in which said each power supply circuit includes:
A. a power supply terminal connected to a load;
B. an energizeable power supply for generating power in response to one of said power supply control signals; and
C. a diode for coupling power from said power supply to said power supply terminal, said diode being connected so as to resist transfer of power from said power supply terminal toward said power supply in the event of failure of the power supply.

* * * * *